(12) United States Patent
Jou et al.

(10) Patent No.: US 10,162,200 B1
(45) Date of Patent: Dec. 25, 2018

(54) ELECTRO-OPTIC PHASE MODULATOR AND METHOD OF MANUFACTURING THE SAME

(71) Applicant: TAIWAN SEMICONDUCTOR MANUFACTURING COMPANY LTD., Hsinchu (TW)

(72) Inventors: Chewn-Pu Jou, Hsinchu (TW); Huan-Neng Chen, Taichung (TW); Lan-Chou Cho, Hsinchu (TW); Feng Wei Kuo, Hsinchu County (TW)

(73) Assignee: TAIWAN SEMICONDUCTOR MANUFACTURING COMPANY LTD., Hsinchu County (TW)

( * ) Notice: Subject to any disclaimer, the term of this patent is extended or adjusted under 35 U.S.C. 154(b) by 0 days.

(21) Appl. No.: 15/626,587

(22) Filed: Jun. 19, 2017

(51) Int. Cl.
*G02F 1/015* (2006.01)
*G02F 1/025* (2006.01)

(52) U.S. Cl.
CPC .............. *G02F 1/015* (2013.01); *G02F 1/025* (2013.01)

(58) Field of Classification Search
CPC .............. G02F 1/01; G02F 1/015; G02F 1/025
USPC ......................................................... 385/1–3
See application file for complete search history.

(56) References Cited

U.S. PATENT DOCUMENTS

| | | | |
|---|---|---|---|
| 6,801,676 B1* | 10/2004 | Liu | G02F 1/3133 257/183 |
| 7,606,455 B2* | 10/2009 | Barrios | H01S 3/0632 385/131 |
| 7,657,130 B2* | 2/2010 | Shastri | G02F 1/0121 385/1 |
| 7,972,522 B2* | 7/2011 | Jordana | B82Y 20/00 216/17 |
| 8,362,494 B2* | 1/2013 | Lo | G02F 1/025 257/13 |
| 8,548,281 B2* | 10/2013 | Kim | G02F 1/025 385/129 |
| 8,676,017 B2* | 3/2014 | Urino | G02F 1/025 385/131 |
| 9,310,629 B2* | 4/2016 | Patel | G02B 6/132 |
| 9,411,176 B2* | 8/2016 | Manouvrier | G02F 1/225 |
| 9,625,746 B2* | 4/2017 | Chen | G02F 1/025 |
| 9,927,637 B2* | 3/2018 | Ogawa | G02F 1/2257 |
| 2009/0207472 A1* | 8/2009 | Kim | G02F 1/025 359/276 |
| 2009/0238511 A1* | 9/2009 | Quitoriano | G02F 1/025 385/2 |
| 2009/0263078 A1* | 10/2009 | Hosomi | G02B 6/12004 385/14 |
| 2010/0316324 A1* | 12/2010 | Webster | G02F 1/2257 385/2 |

(Continued)

*Primary Examiner* — Robert Tavlykaev
(74) *Attorney, Agent, or Firm* — WPAT, P.C., Intellectual Property Attorneys; Anthony King

(57) ABSTRACT

An electro-optic (EO) phase modulator is disclosed. The EO phase modulator includes: an insulating layer; a central optical waveguide over the insulating layer; a first region having a first type doping adjacent to a first sidewall of the central optical waveguide; a second region having a second type doping opposite to the first type doping adjacent to a second sidewall of the central optical waveguide opposite to the first sidewall; and a first dielectric layer passing through the central optical waveguide from a top surface of the central optical waveguide to a bottom surface of the central optical waveguide. A method of manufacturing the same is disclosed as well.

17 Claims, 11 Drawing Sheets

(56) References Cited

U.S. PATENT DOCUMENTS

| | | | |
|---|---|---|---|
| 2012/0063714 A1* | 3/2012 | Park | G02F 1/025 385/8 |
| 2012/0321240 A1* | 12/2012 | Alloatti | G02F 1/025 385/2 |
| 2015/0212346 A1* | 7/2015 | Zheng | G02F 1/025 398/186 |
| 2017/0276970 A1* | 9/2017 | Chuang | G02F 1/025 |

* cited by examiner

US 10,162,200 B1

ELECTRO-OPTIC PHASE MODULATOR AND METHOD OF MANUFACTURING THE SAME

BACKGROUND

Metal interconnections are expected to become a bottleneck of performance of electronic systems as transistors continue to scale to smaller sizes. Optical interconnections, implemented at different levels ranging from rack-to-rack down to chip-to-chip and intra-chip interconnections could enable low power dissipation, low latencies and high bandwidths. The realization of such small scale optical interconnections relies on the ability to integrate micro-optical devices with the microelectronics chip. The silicon low-loss waveguides, amplifiers and lasers advance this integrative goal, but a silicon electro-optic modulator with high performance for chip-scale integration is needed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. Specifically, dimensions of the various features may be arbitrarily increased or reduced for clarity of discussion.

DETAILED DESCRIPTION

Figure 1:
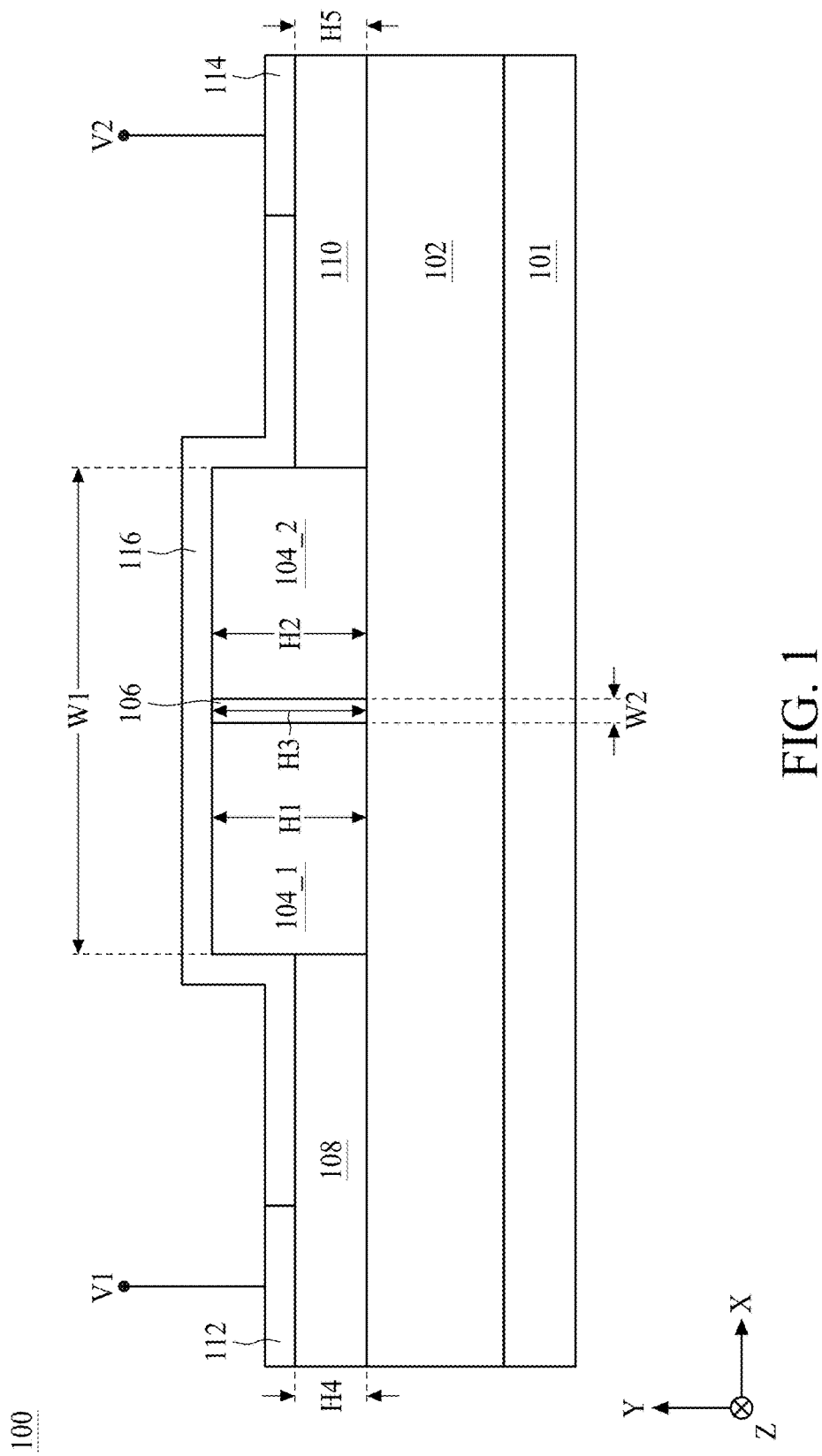
FIG. 1 is a cross-sectional view of an electro-optic (EO) phase modulator in accordance with an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments and configurations discussed.

Further, spatially relative terms, such as "beneath," "below," "lower," "above," "upper" and the like, may be used herein for ease of description to describe one element or feature's relationship to another element or feature as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating or working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a cross-sectional view of an electro-optic (EO) phase modulator 100 in accordance with an exemplary embodiment of the present disclosure. The electro-optic phase modulator 100 serves as a basis for an analog optical modulator. As shown in FIG. 1, the exemplary electro-optic (EO) waveguide structure 100 may include a silicon substrate 101 and an insulating layer 102 (also referred to as a buried oxide or BOX layer) disposed over the silicon substrate 101. A silicon layer, including an n-doped region 108, a first intrinsic (single crystal) region 104_1, a second intrinsic region 104_2, and a p-doped region 110, is disposed over the insulating layer 102. The silicon layer, including the n-doped region 108, the first intrinsic region 104_1, the second intrinsic region 104_2, and the p-doped region 110, may be altogether referred to as a silicon-on-insulator (SOI) layer. The first intrinsic region 104_1 forms a first "plate" of the electro-optic phase modulator 100, and the second intrinsic region 104_2 forms a second "plate" of the electro-optic phase modulator 100.

The first intrinsic region 104_1 and the second intrinsic region 104_2 disposed between the n-doped region 108 and the p-doped region 110 are arranged to be an central optical waveguide of the electro-optic phase modulator 100 and serve as a conduit for guiding light into/out of the page in the view of FIG. 1 along a Z axis. In particular, the structure of the first intrinsic region 104_1 and the second intrinsic region 104_2 between the n-doped region 108 and the p-doped region 110 forms a PIN diode modulator and is arranged to vary the refractive index in the central optical waveguide according to the free carrier dispersion effect as will be discussed in detail below. Generally, the first intrinsic region 104_1 and the second intrinsic region 104_2 are rectangular structures. However, in some embodiments, the first intrinsic region 104_1 and the second intrinsic region 104_2 may have other geometry structures, such as cylindrical structures. Light rays are predominantly confined in the first intrinsic region 104_1 and the second intrinsic region 104_2 by internal reflection. The first intrinsic region 104_1 and the second intrinsic region 104_2 may be undoped or lightly doped compared to the n-doped region 108 and the p-doped region 110, which are heavily doped with n-type dopants and p-type dopants, respectively.

A thin dielectric layer 106 is disposed between the first intrinsic region 104_1 and the second intrinsic region 104_2. The thin dielectric layer 106 is configured to completely separate the first intrinsic region 104_1 and the second intrinsic region 104_2. In other words, the thin dielectric layer 106 passes through the central optical waveguide of the electro-optic phase modulator 100 from a top surface to a bottom surface of the central optical waveguide. As a result, the thin dielectric layer 106 defines a boundary between the first intrinsic region 104_1 and the second intrinsic region 104_2. In some embodiments, the thin dielectric layer 106 is disposed along a vertical center line of the central optical waveguide of the electro-optic phase modulator 100. Consequently, the first intrinsic region 104_1 is substantially equal to the second intrinsic region 104_2 in width. However, this is not a limitation of the present disclosure. In some embodiments, the width of the first intrinsic region 104_1 may be greater or smaller than the width of the second intrinsic region 104_2.

A thickness H1 of the first intrinsic region 104_1 along a Y axis as shown in FIG. 1, a thickness 112 of the second intrinsic region 104_2 along the Y axis, and a thickness 113 of the thin dielectric layer 106 along the Y axis are each larger than a thickness H4 of the n-doped region 108 along the Y axis and also a thickness H5 of the p-doped region 110 along the Y axis. In the exemplary embodiments, the thickness H1 of the first intrinsic region 104_1, the thickness 112 of the second intrinsic region 104_2, and the thickness H3 of the thin dielectric layer 106 are substantially equal. In the exemplary embodiments, the thickness H4 of the n-doped region 108 and the thickness H5 of the p-doped region 110 are substantially equal. However, in some embodiments, the thickness 113 of the thin dielectric layer 106 may be greater than the thickness H1 of the first intrinsic region 104_1 and/or the thickness H2 of the second intrinsic region 104_2. In some embodiments, the thickness H4 of the n-doped region 108 may be larger or smaller than the thickness H5 of the p-doped region 110.

The thickness H1 of the first intrinsic region 104_1 and/or the thickness H2 of the second intrinsic region 104_2 may be in a range from about 10 nanometers (nm) to about 10 micrometers (um). In order to minimize absorption losses, the thickness H4 of the n-doped region 108 and/or the thickness H5 of the p-doped region 110 may be in a range from about 10% to about 80% of the thickness H1 of the first intrinsic region 104_1, the thickness 112 of the second intrinsic region 104_2, and/or the thickness 113 of the thin dielectric layer 106. In some embodiments, the thickness H4 of the n-doped region 108 and/or the thickness H5 of the p-doped region 110 may be in a range from about ⅓ to about ⅔ of the thickness H1 of the first intrinsic region 104_1, the thickness 112 of the second intrinsic region 104_2, and/or the thickness 113 of the thin dielectric layer 106. A width W1 across the first intrinsic region 104_1, the thin dielectric layer 106 and the second intrinsic region 104_2 along an X axis perpendicular to the Y axis as shown in FIG. 1 may be in a range from about 100 nm to about 30 um.

The thin dielectric layer 106 may have a thickness W2 in a range of about 2 nm to about 10 nm. The thin dielectric layer 106 may include low-temperature (e.g., 210° C.) high-k dielectric material such as zirconium dioxide ($ZrO_2$), aluminum oxide ($Al_2O_3$), hafnium oxide ($HfO_x$), Hafnium silicate ($HfSiO_x$), zirconium titanate ($ZrTiO_x$), tantalum oxide ($TaO_x$), a laminated layer of $ZrO_2$—$Al_2O_3$—$ZrO_2$ (ZAZ, having dielectric constant (k) of about 13.6), etc. In some embodiments, the thin dielectric layer 106 may include strontium titanate ($SrTiO_3$ having dielectric constant (k) of about 83 to about 100) or barium titanate ($BaTiO_3$, having dielectric constant (k) of about 500). In some embodiments, the thin dielectric layer 106 may include barium strontium titanate ($BaSrTiO_3$, BST), lead zirconate titanate ($PbZrTiO_3$, PZT).

A first electrical contact 112 is disposed on the n-doped region 108; and a second electrical contact 114 is disposed on the p-doped region 110, where the application of a modulating electrical signal therebetween will modify the optical characteristics (e.g., refractive index) of the electro-optic phase modulator 100 and thus affect the properties of a propagating optical signal. The heavily-doped n-doped region 108 and the heavily-doped p-doped region 110 underneath the first electrical contact 112 and the second electrical contact 114, respectively, are able to lower the contact resistance.

In operation, the first electrical contacts 112 and the second electrical contacts 114 are coupled to a first voltage supply V1 and a second voltage supply V2, respectively, so as to forward bias the diode and thereby inject free carriers into the central optical waveguide, i.e. the first intrinsic region 104_1 and the second intrinsic region 104_2. The increase in free carriers changes the refractive index of the silicon and can therefore be used to achieve phase modulation of light transmitting through the waveguide. However, some of the free carriers in the first intrinsic region 104_1 and the second intrinsic region 104_2 may spread laterally away from the central optical waveguide to the n-doped region 108 and the p-doped region 110. This leads to a leakage current component that increases the necessary dc power in order to obtain the targeted carrier concentration (refractive index change) in the central optical waveguide. The thin dielectric layer 106 between the first intrinsic region 104_1 and the second intrinsic region 104_2 helps to electrically disconnect a path directly from the n-doped region 108 to the p-doped region 110, therefore achieving the purpose of suppressing the leakage current. The utilization of the above low-temperature high-k dielectric material is advantageous to reduce the leakage current.

In some embodiments, a dielectric layer 116 is formed over the first intrinsic region 104_1, the second intrinsic region 104_2, the thin dielectric layer 106 and a portion of the n-doped region 108 and the p-doped region 110. In particular, the dielectric layer 116 is conformally formed to blanket cover at least the top surface, a portion of a left sidewall and a portion of a right sidewall of the central optical waveguide as shown in FIG. 1. The dielectric layer 116 serves as a waveguide cladding layer, exhibiting a lower effective refractive index than the first intrinsic region 104_1 and the second intrinsic region 104_2. With the dielectric layer 116, the effective refractive index decreases away from the central optical waveguide and thus provides substantial vertical and horizontal optical signal confinement within the electro-optic phase modulator 100.

FIGS. 2-8 are cross sectional views of the electro-optic phase modulator 100 illustrated in FIG. 1 at different stages of a manufacturing process, in accordance with some embodiments of the present disclosure. Like elements in FIGS. 2-7 are designated with the same reference numbers for ease of understanding. After the different stages in FIGS. 2-7, the electro-optic phase modulator 100 has the cross-sectional view in FIG. 1. Although FIGS. 2-7 are described, it will be appreciated that the structures disclosed in FIG. 1 are not limited to the manufacturing process shown in FIGS. 2-7. While the exemplary manufacturing process is illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 2:
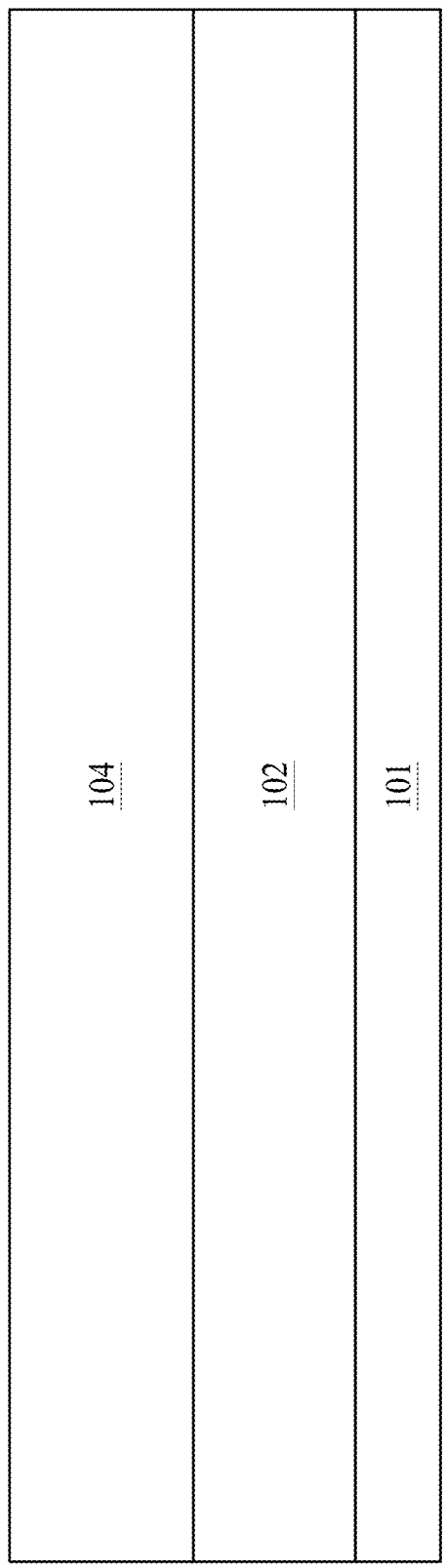
FIGS. 2-8 are cross-sectional views of the electro-optic phase modulator illustrated in FIG. 1 at different stages of a manufacturing process, in accordance with some embodiments of the present disclosure.

FIG. 2 shows a cross-sectional view of a silicon on insulator (SOI) structure that has been wafer bonded to a silicon substrate. In accordance with exemplary embodiments of this disclosure, FIG. 2 includes a silicon substrate 101 having a selected first surface orientation and a doping level. Overlaying the substrate 101 is a buried oxide layer, BOX, 102. The BOX 102 may have a thickness between about 10 to 200 nm, preferably about 50 nm. Overlaying the BOX 102 is a SOI silicon substrate 104 having a selected second surface orientation and a doping level. Alternative embodiments not illustrated include alternative substrates such as Ge, GaAs, GaAlAs, InP, or GaN. The selected second surface orientation may be different from the selected first surface orientation, and the doping level of the SOI silicon substrate 104 may be different from the doping level of the substrate 101. However, this is not a limitation of the present disclosure. In some embodiments, the selected second surface orientation may be substantially the same as the selected first surface orientation, and the doping level of the SOI silicon substrate 104 may be substantially equal to the doping level of the substrate 101.

Figure 3:
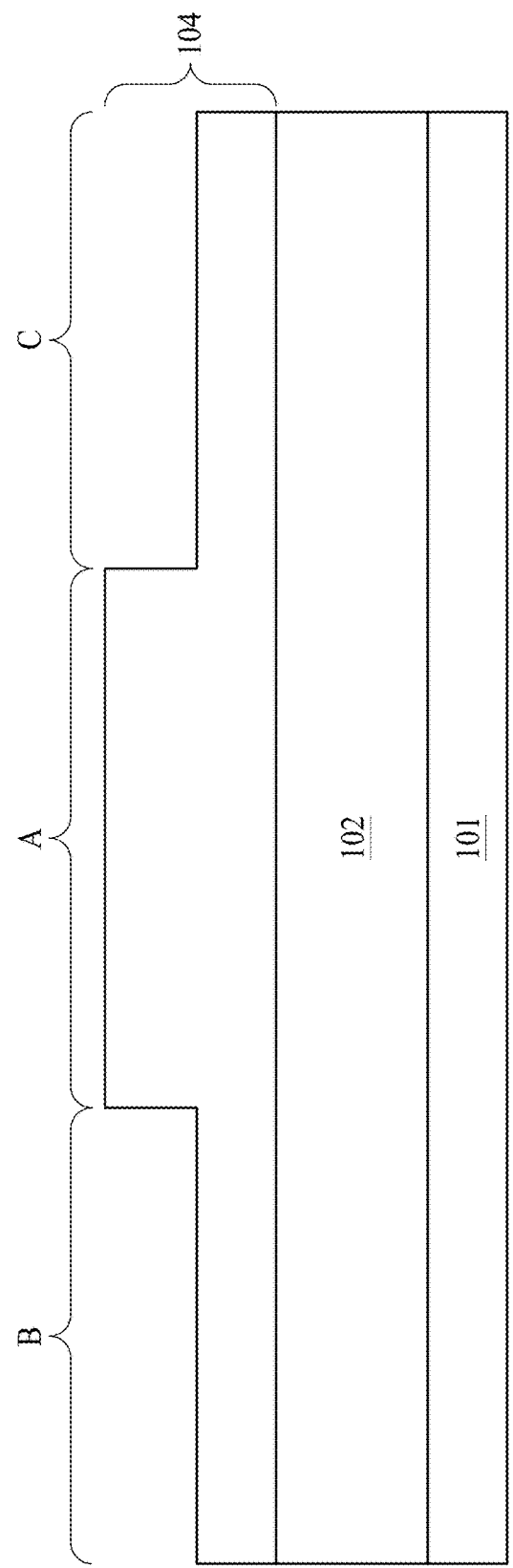

Next, a portion of the SOI silicon substrate 104 is removed, forming a protrusion feature as illustrated in FIG. 3. The protrusion feature may be defined using lithography followed by reactive ion plasma etching (RIE). The protrusion feature of the SOI silicon substrate 104 includes a central optical waveguide region A, a first thin slab layer B and a second thin slab layer C at opposite sides of the central optical waveguide. A thickness of the first thin slab layer B and/or a thickness of the second thin slab layer C may be in a range from about 10% to about 80% of a thickness of the central optical waveguide region A. In some embodiments, the thickness of the first thin slab layer B and/or the thickness of the second thin slab layer C may be in a range from about ⅓ to about ⅔ of the thickness of the central optical waveguide region A.

Figure 4:
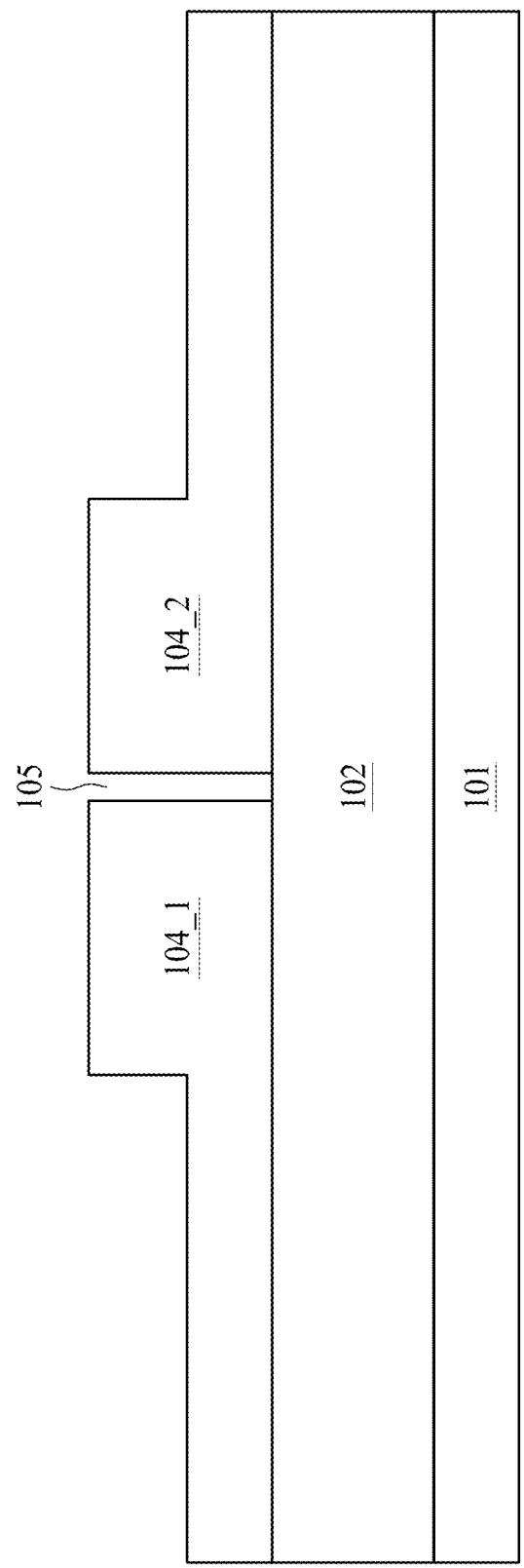
Figure 5:
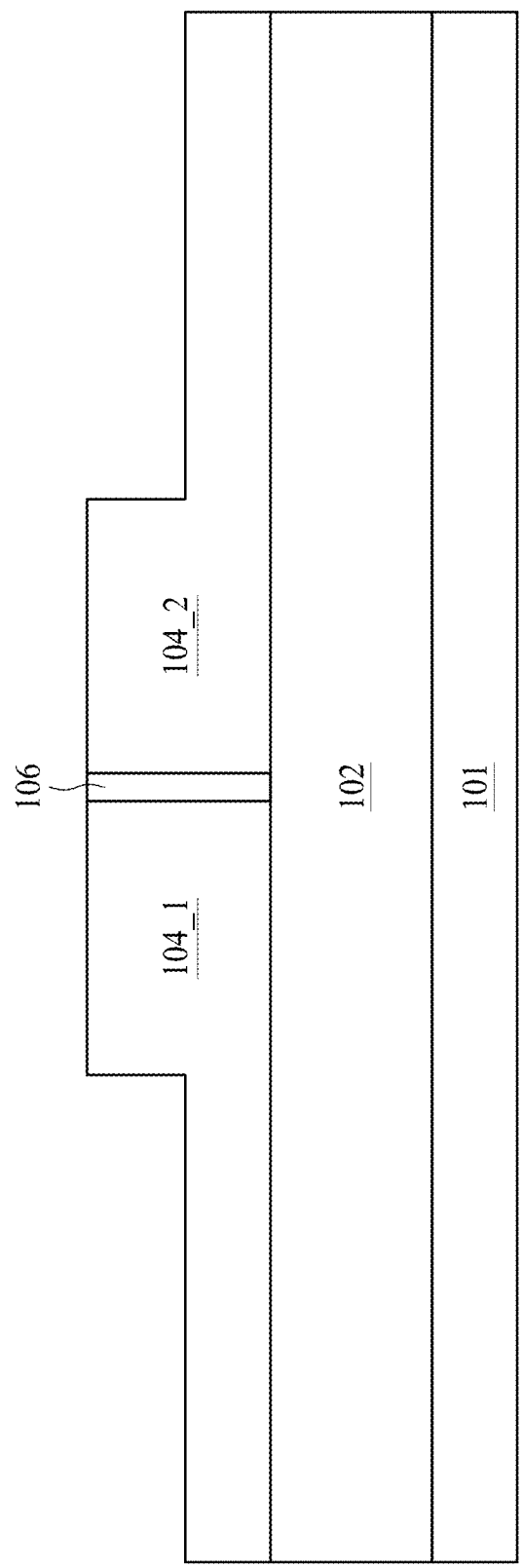

Next, a trench 105 is made through the SOI silicon substrate 104, exposing the buried oxide layer 102 as shown in FIG. 4. The SOI silicon substrate 104 is therefore divided into a first SOI region 104_1 and a second SOI region 104_2. The trench 105 is then filled with a suitable dielectric material 106 such as low-temperature (e.g., 210° C.) high-k dielectric material, as shown in FIG. 5. The low-temperature high-k dielectric material may include zirconium dioxide ($ZrO_2$), aluminum oxide ($Al_2O_3$), hafnium oxide ($HfO_x$), Hafnium silicate ($HfSiO_x$), zirconium titanate ($ZrTiO_x$), tantalum oxide ($TaO_x$), a laminated layer of $ZrO_2$—$Al_2O_3$—$ZrO_2$ (ZAZ, having dielectric constant (k) of about 13.6), etc. In some embodiments, the thin dielectric layer 106 may include strontium titanate ($SrTiO_3$ having dielectric constant (k) of about 83 to about 100) or barium titanate ($BaTiO_3$, having dielectric constant (k) of about 500). In some embodiments, the thin dielectric layer 106 may include barium strontium titanate ($BaSrTiO_3$, BST), lead zirconate titanate ($PbZrTiO_3$, PZT).

Figure 6:
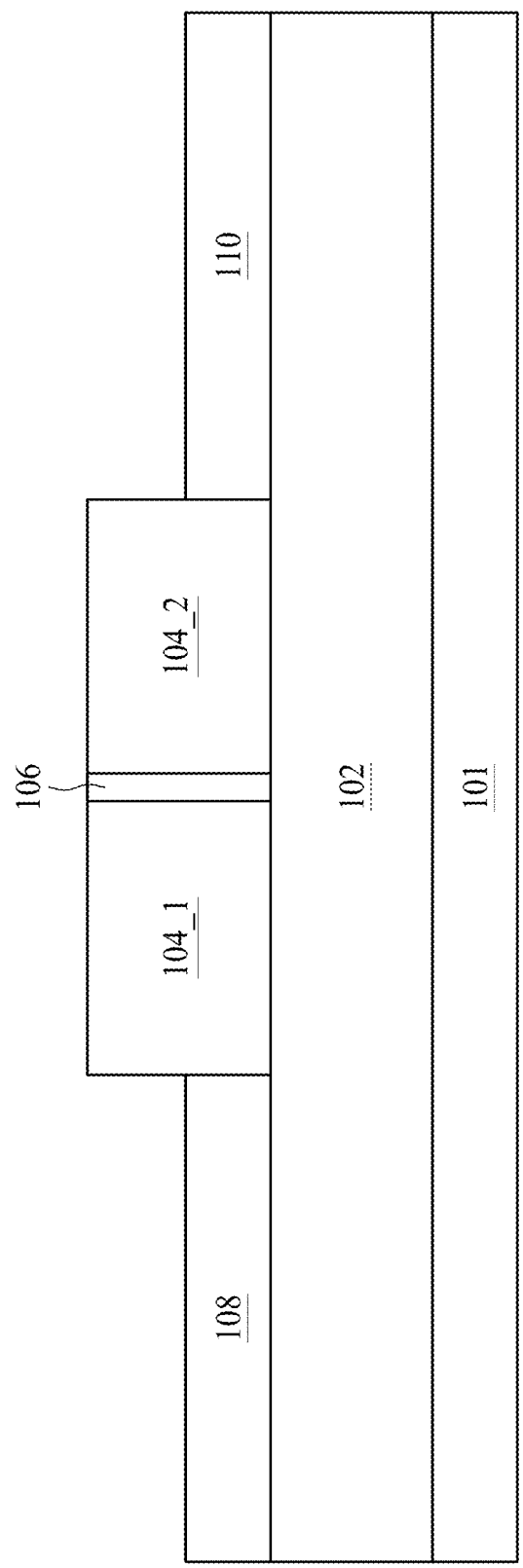
Figure 7:
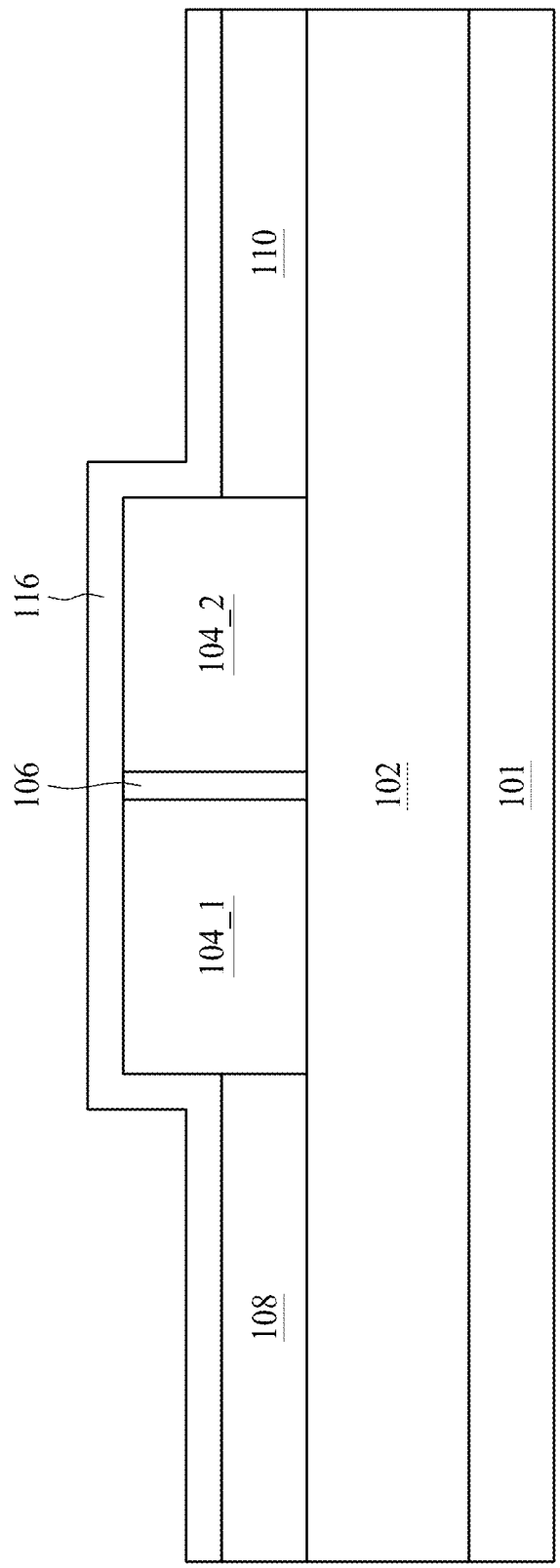
Figure 8:
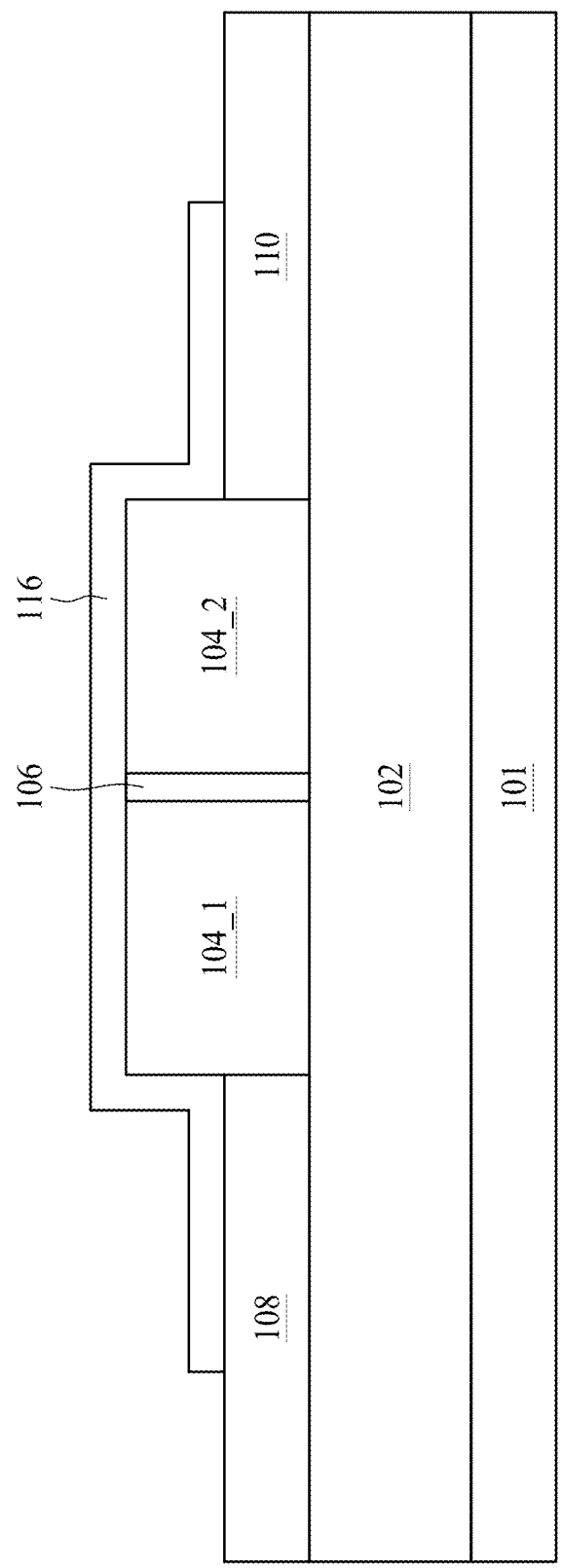

As shown in FIG. 6, the n-doped region 108 and the p-doped region 110 may be defined using photolithography, and doping may be accomplished by ion implantation. After ion implantation, a silicon oxide layer 116 may be deposited onto the first SOI region 104_1, the second SOI region 104_2, the thin dielectric layer 106, the n-doped region 108 and the p-doped region 110 using for instance plasma enhanced chemical vapor deposition, as shown in FIG. 7. Next, as shown in FIG. 8, recesses are then opened into the silicon oxide layer 116 using photolithography and plasma etching for depositing the metal contacts, i.e. the first electrical contact 112 and the second electrical contact 114. The resulting structure is shown in FIG. 1.

Figure 9:
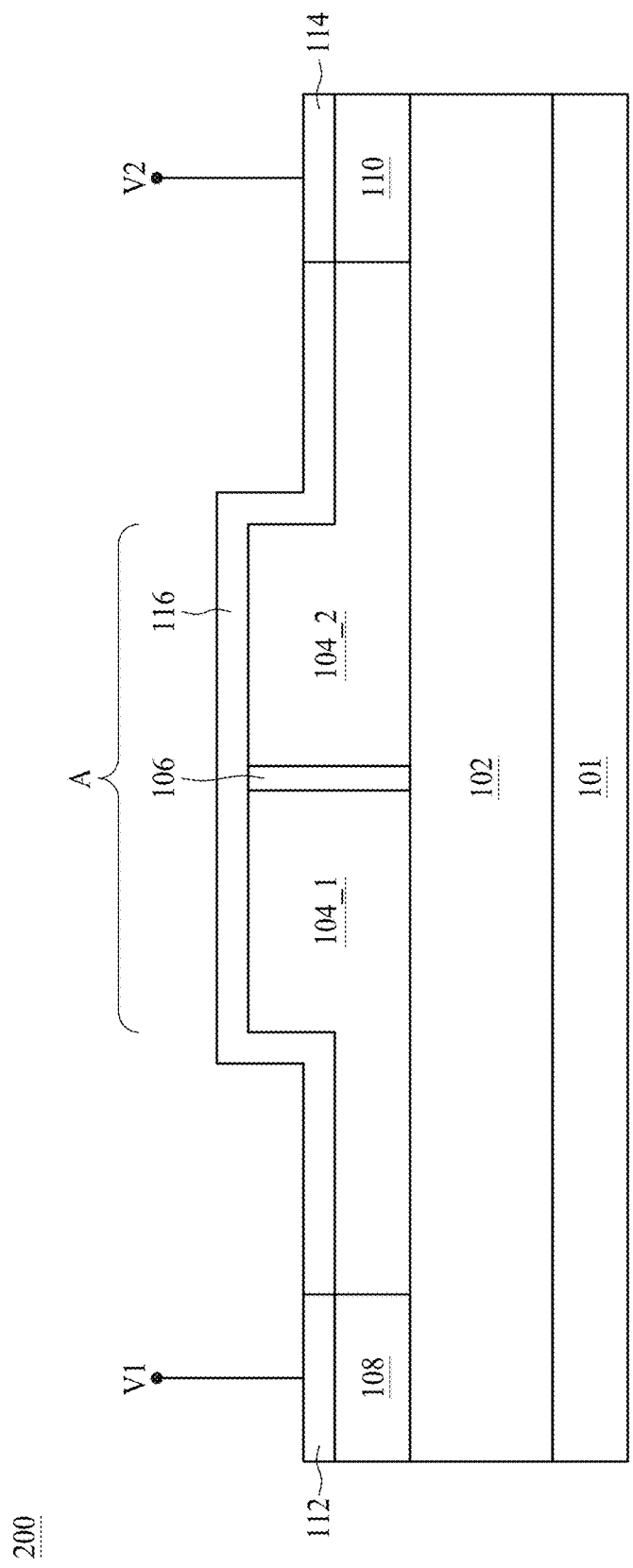
FIG. 9 is a cross-sectional view of an electro-optic (EO) phase modulator in accordance with another embodiment of the present disclosure.

FIG. 9 is a cross-sectional view of an electro-optic (EO) phase modulator 200 in accordance with another embodiment of the present disclosure. Referring to FIG. 9, the n-doped region 108 and the p-doped region 110 are disposed away from the central optical waveguide region A in order to minimize absorption losses. For example, the n-doped region 108 and the p-doped region 110 are formed approximately 1 μm away from the central optical waveguide region A.

Figure 10:
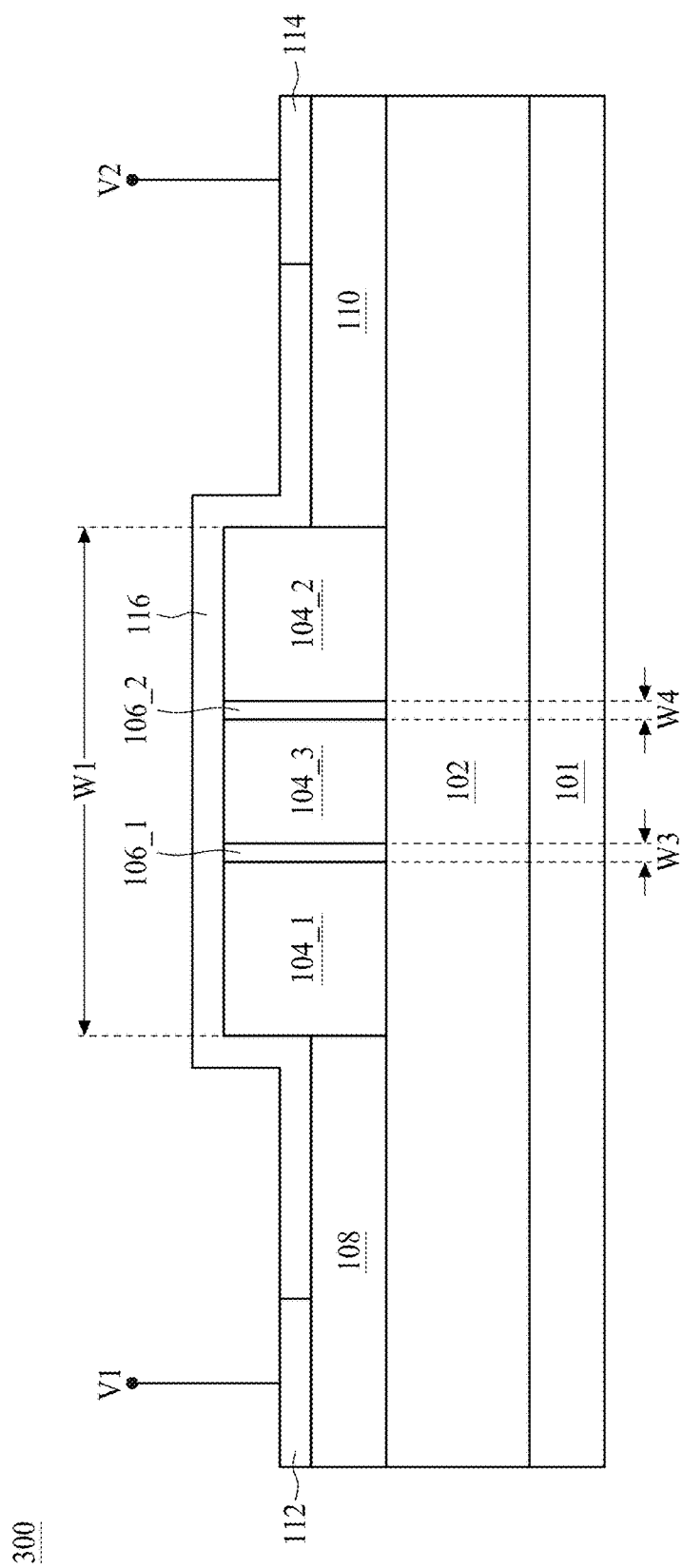
FIG. 10 is a cross-sectional view of an electro-optic (EO) phase modulator in accordance with still another embodiment of the present disclosure.

FIG. 10 is a cross-sectional view of an electro-optic (EO) phase modulator 300 in accordance with still another embodiment of the present disclosure. Referring to FIG. 10, the central optical waveguide of the electro-optic phase modulator 300 are divided into three regions, i.e. the first intrinsic region 104_1, the second intrinsic region 104_2 and a third intrinsic region 104_3, by a first thin dielectric layer 106_1 and a second thin dielectric layer 106_2. The first thin dielectric layer 106_1 is disposed in parallel to the second thin dielectric layer 106_2 according to some embodiments of the present disclosure. In order to maintain the leakage suppression performance, a width W3 of the first thin dielectric layer 106_1 and a width W4 of the second thin dielectric layer 106_2 may have a summation substantially equals to the width W2 of the thin dielectric layer 106 of the electro-optic phase modulator 100 of FIG. 1 in accordance with a preferred embodiment. However, this is not a limitation of the present disclosure. In some embodiments, the summation of the width W3 of the first thin dielectric layer 106_1 and the width W4 of the second thin dielectric layer 106_2 may be smaller or greater than the width W2 of the thin dielectric layer 106 of the electro-optic phase modulator 100 of FIG. 1.

The width W1 of the central optical waveguide of the electro-optic phase modulator 300 may be substantially equal to that of the electro-optic phase modulator 100. However, the total amount of induced charges in operation of the electro-optic phase modulator 300 may be doubled compared to the electro-optic phase modulator 100 as will be discussed in detail below. In some embodiments, the central optical waveguide of the electro-optic phase modulator may be divided into more than three regions by more than two thin dielectric layers. In principle, the more numbers of the divisions of the central optical waveguide, the more effective the electro-optic phase modulator in creating phase and/or amplitude changes.

Figure 11:
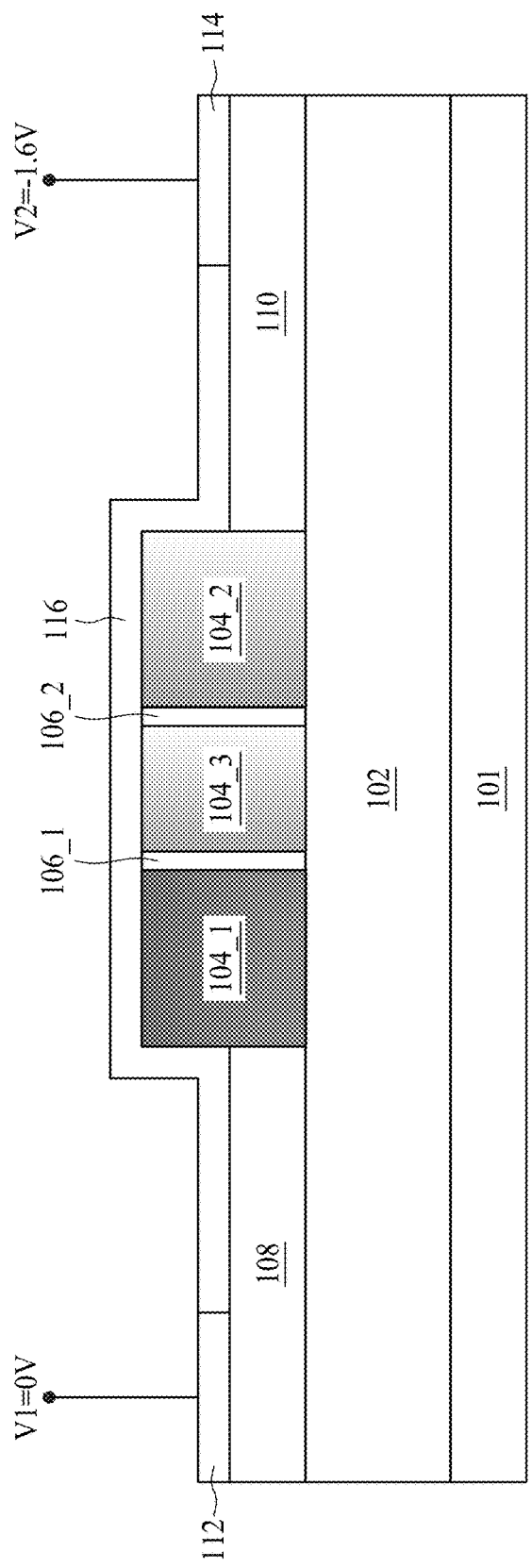
FIG. 11 is a cross-sectional view of charge distribution in the electro-optic phase modulator illustrated in FIG. 10 in an operation.

FIG. 11 is a cross-sectional view of charge distribution in the electro-optic phase modulator 300 in an operation. Referring to FIG. 11, the electro-optic phase modulator 300 is forward biased when the first voltage supply V1 is 0 V and the second voltage supply V2 is −1.6 V. The different shades of the first intrinsic region 104_1, the second intrinsic region 104_2 and a third intrinsic region 104_3 represent different levels of charge density. In particular, the charge density is higher when the color is darker. As shown in FIG. 11, two depletion regions are formed in the second intrinsic region 104_2 and a third intrinsic region 104_3. Accordingly, the charge variation is presented in the second intrinsic region 104_2 and a third intrinsic region 104_3. In other words, the area of region associated with charge variation is more than that of the electro-optic phase modulator 200. Therefore, the electro-optic phase modulator 300 is more effective in creating phase and/or amplitude changes than the electro-optic phase modulator 100.

Some embodiment of the present disclosure provides an electro-optic (EO) phase modulator. The EO phase modulator includes: an insulating layer; a central optical waveguide over the insulating layer; a first region having a first type doping adjacent to a first sidewall of the central optical waveguide; a second region having a second type doping opposite to the first type doping adjacent to a second sidewall of the central optical waveguide opposite to the first sidewall; and a first dielectric layer passing through the central optical waveguide from a top surface of the central optical waveguide to a bottom surface of the central optical waveguide.

Some embodiment of the present disclosure provides an electro-optic (EO) phase modulator. The EO phase modulator includes: an insulating layer; a first intrinsic region over the insulating layer; a second intrinsic region over the insulating layer; a vertical dielectric layer over the insulating layer, wherein the vertical dielectric layer includes a first sidewall and a second sidewall opposite to the first sidewall, and the first intrinsic region is adjacent to the first sidewall and the second intrinsic region is adjacent to the second sidewall; a first region having a first type doping adjacent to the first intrinsic region; and a second region having a second type doping opposite to the first type doping adjacent to the second intrinsic region.

Some embodiment of the present disclosure provides a method of manufacturing an electro-optic (EO) phase modulator. The method includes: providing a silicon substrate over an insulator; removing a portion of the silicon substrate to form a protrusion feature including a central optical waveguide region and a first thin slab layer and a second thin slab layer at two sides of the central optical waveguide region; forming a trench in the central optical waveguide region to expose a portion of the insulator; filling the trench with a dielectric material; defining a first region having a first type doping at the first thin slab layer; and defining a second region having a second type doping opposite to the first type doping at the second thin slab layer.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An electro-optic (EO) phase modulator, comprising:
an insulating layer;
a central optical waveguide over the insulating layer, the central optical waveguide including a first undoped region, a second undoped region and a third undoped region;
a first region having a semiconductor material with a first type doping, the first region adjacent to a first sidewall of the central optical waveguide;
a second region having a semiconductor material with a second type doping opposite to the first type doping, the second region adjacent to a second sidewall of the central optical waveguide opposite to the first sidewall;
a first dielectric layer passing through the central optical waveguide from a top surface of the central optical waveguide to a bottom surface of the central optical waveguide; and
a second dielectric layer passing through the central optical waveguide from the top surface of the central optical waveguide to the bottom surface of the central optical waveguide;
wherein
the first dielectric layer is between and directly interfacing the first undoped region and the second undoped region;
the second dielectric layer is between and directly interfacing the second undoped region and the third undoped region, and
the second undoped region is a contiguous undoped region.

2. The EO phase modulator of claim 1, wherein the first dielectric layer is disposed between the first sidewall and a vertical center line of the central optical waveguide.

3. The EO phase modulator of claim 2, wherein the second dielectric layer is disposed between the second sidewall and the vertical center line of the central optical waveguide.

4. The EO phase modulator of claim 1, wherein the first region and the second region have a thickness in a range from about 10% to about 80% of a thickness of the central optical waveguide.

5. The EO phase modulator of claim 1, wherein the first dielectric layer and the second dielectric layer include a high-k dielectric material.

6. The EO phase modulator of claim 5, wherein the high-k dielectric material includes zirconium dioxide ($ZrO_2$), aluminum oxide ($Al_2O_3$), hafnium oxide ($HfO_x$), Hafnium silicate ($HfSiO_x$), zirconium titanate ($ZrTiO_x$), tantalum oxide ($TaO_x$), a laminated layer of $ZrO_2$—$Al_2O_3$—$ZrO_2$ (ZAZ), strontium titanate ($SrTiO_3$), barium titanate ($BaTiO_3$), barium strontium titanate ($BaSrTiO_3$, BST), or lead zirconate titanate ($PbZrTiO_3$, PZT).

7. The EO phase modulator of claim 1, further comprising a waveguide cladding layer blanket covering the top surface, a portion of the first sidewall, and a portion of the second sidewall of the central optical waveguide.

8. The EO phase modulator of claim 1, further comprising:
a first electrical contact over the first region; and
a second electrical contact over the second region.

9. The EO phase modulator of claim 1, wherein the second dielectric layer is parallel to the first dielectric layer.

10. An electro-optic (EO) phase modulator, comprising:
an insulating layer;
a first intrinsic region over the insulating layer;
a second intrinsic region over the insulating layer;
a third intrinsic region over the insulating layer;
a first vertical dielectric layer over the insulating layer, wherein the first vertical dielectric layer includes a first sidewall and a second sidewall opposite to the first sidewall of the first vertical dielectric layer, and the first intrinsic region is directly interfacing the first sidewall of the first vertical dielectric layer and the second intrinsic region is directly interfacing the second sidewall of the first vertical dielectric layer;
a second vertical dielectric layer over the insulating layer, wherein the second vertical dielectric layer includes a first sidewall and a second sidewall opposite to the first sidewall of the second vertical dielectric layer, and the second intrinsic region is directly interfacing the first sidewall of the second vertical dielectric layer and the third intrinsic region is directly interfacing the second sidewall of the second vertical dielectric layer;
a first region having a semiconductor material with a first type doping, the first region adjacent to the first intrinsic region; and
a second region having a semiconductor material with a second type doping opposite to the first type doping, the second region adjacent to the third intrinsic region;
wherein the first intrinsic region, the second intrinsic region and the third intrinsic region are undoped, and the second intrinsic region is a contiguous intrinsic region.

11. The EO phase modulator of claim 10, further comprising a substrate below the insulating layer.

12. The EO phase modulator of claim 10, wherein the first region and the second region have a thickness in a range from about ⅓ to about ⅔ of a thickness of first intrinsic region, the second intrinsic region and the third intrinsic region.

13. The EO phase modulator of claim 10, wherein a width of the first vertical dielectric layer and the second vertical dielectric layer is in a range of about 2 nm to about 10 nm.

14. The EO phase modulator of claim 10, further comprising a cladding dielectric layer covering at least a top surface of the first intrinsic region, a top surface of the second intrinsic region and a top surface of the third intrinsic region.

15. The EO phase modulator of claim 14, wherein the cladding dielectric layer has a lower effective refractive index than the first intrinsic region, the second intrinsic region and the third intrinsic region.

16. The EO phase modulator of claim 10, further comprising:
a first electrical contact over the first region; and
a second electrical contact over the second region.

17. A method of manufacturing an electro-optic (EO) phase modulator, comprising:
providing a silicon substrate over an insulator;
removing a portion of the silicon substrate to form a protrusion feature including a contiguous central optical waveguide region and a first thin slab layer and a second thin slab layer at two sides of the central optical waveguide region, wherein the central optical waveguide region is undoped;
forming a first trench in the central optical waveguide region to expose a portion of the insulator;
forming a second trench in the central optical waveguide region to expose a portion of the insulator;
filling the first trench and the second trench with a dielectric material directly interfacing the undoped central optical waveguide region;
defining a first region having a first type doping at the first thin slab layer; and
defining a second region having a second type doping opposite to the first type doping at the second thin slab layer.

* * * * *